United States Patent

[11] 3,607,370

| [72] | Inventors | Catherine Aranyi<br>Chicago;<br>Kurt Gutfreud, Park Forrest; Ervin J. Hawrylewicz, Olympia Fields; Joseph S. Wall, Peoria, all of Ill. |
|---|---|---|
| [21] | Appl. No. | 842,061 |
| [22] | Filed | May 21, 1969 |
| [23] | | Division of Ser. No. 680,030, Nov. 2, 1967, Pat. No. 3,522,197 |
| [45] | Patented | Sept. 21, 1971 |
| [73] | Assignee | The United States of America as represented by the Secretary of Agriculture |

[54] PRESSURE-SENSITIVE ADHESIVE TAPE COMPRISING GLUTEN HYDROLYPATE DERIVATIVES
2 Claims, No Drawings

[52] U.S. Cl.................................................... 117/122 P, 106/124, 106/136, 106/147, 106/153, 106/161, 117/122 PA, 117/122 PF, 117/161 UT, 206/.5, 206/184, 252/90, 252/93, 260/8, 260/112 GR

[51] Int. Cl.................................................... C09j 7/02
[50] Field of Search.......................................... 117/122 P, 122 PA, 122 PB, 122 PF, 76 A, 161 UT; 106/124, 161, 153, 136, 147; 260/112, 8, 84, .5; 150/.5; 252/90, 93

[56] References Cited
UNITED STATES PATENTS

| 2,831,847 | 4/1958 | Selle............................. | 252/152 X |
| 3,313,647 | 4/1967 | Weymann..................... | 117/122 |
| 3,413,229 | 11/1968 | Bianco et al.................. | 252/93 X |
| 3,503,495 | 3/1970 | Gustafson et al.............. | 117/122 UX |

*Primary Examiner*—William D. Martin
*Assistant Examiner*—Bernard D. Pianalto
*Attorneys*—R. Hoffman and W. Bier ABSTRACT: A pressure-sensitive adhesive tape comprising a backing with a pressure-sensitive coating comprising epoxy derivatives of the large peptide fraction of partially hydrolyzed gluten polymerized with various acrylic compounds.

PRESSURE-SENSITIVE ADHESIVE TAPE COMPRISING GLUTEN HYDROLYPATE DERIVATIVES

This application is a division of application Ser. No. 680,030, filed Nov. 2, 1967 and now U.S. Pat. No. 3,522,197.

This invention relates broadly to ethylene oxide derivatives of partially hydrolyzed cereal grain gluten and to self-seal adhesives thereof.

The primary purpose of our invention is the provision of a variety of highly useful derivatives and acrylic-type copolymers of gluten whereby the industrial utilization of wheat flour may be considerably enhanced.

A more specific object of our invention is the provision of novel internal plasticizers for self-seal adhesive compositions some of which exhibit a somewhat greater resistance to peel at 10° C. from a smooth steel substrate than does the widely known self-stick transparent tape.

The partially hydrolyzed gluten polypeptide starting material is obtained by dispersing either commercially obtained vital gluten (containing about 20 percent residual starch) or laboratory process starch-free gluten obtained from wheat starch by the method of Jones et. al., Arch. Biochem. and Biophys. 84:363 (1959), in 49 times its weight of an acid mixture that consists of 0.1N hydrochloric acid and 4N acetic acid and exposing the therein-dispersed 2 percent content of protein to 24 hours of partial hydrolysis at 60° C. In the case of commercial gluten, the hydrolysate preferably is freed of its nonreacted starch and lipid by high-speed centrifugations before the gel filtration step on a column of Sephadex 025 is applied to the hydrolysate to remove the inorganic (ammonium salt) byproducts of the hydrolysis as well as the small peptides. Elution with 4N acetic acid, during which the aliquots of the eluant are monitored spectrophotometrically by UV absorbency at 280 m$\mu$ for the proteinaceous components and by nesslerization at 490 m$\mu$ for the first appearance of ammonia provides the desired principal first fraction containing essentially only the large polypeptides, in which purified fraction the number of free amino groups from the cleavage of peptide bonds as determined by the ninhydrin reaction corresponds to 1.4 $\mu$M leucine equivalents per milligram total nitrogen. Gel filtration values on Sephadex show the average molecular weight of the polypeptide mixture to be between 10,000 and 20,000.

The purified gluten hydrolysate dried by lyophilization is acetic acid soluble. The product can be converted into the water-soluble form by preparing its 5-percent dispersion in water and by slowly adding sufficient NaOH to bring the pH from an original value of about 3 to 8.0.

EXAMPLE 1

A stainless steel pressure bomb was charged with 1 part by weight of the previously described acetic acid soluble gluten hydrolysate and 5 parts by weight of ethylene oxide and then maintained at 85° C. for 48 hours. The obtained epoxidized gluten hydrolysate product, which we will for brevity call ETOG, was homogenous viscous liquid that, unlike the protein, was soluble in water and in organic solvents including acetone, benzene, methanol, ethanol, and methylene chloride.

Amino acid analysis of the ETOG showed that the epoxidation had resulted in the loss of aspartic and glutamic acids as well as of serine, threonine, and tyrosine. ETOG had a sedimentation coefficient of 0.92 Svedberg units.

EXAMPLE 2

A 1:1 mixture of ETOG and hydroxyethyl methacrylate was reacted at 80° C. for 2 hours in the presence of 2 percent tert. butyl peroxide initiator based on the weight of the acrylic monomer. The partially polymerized viscous material was transferred from the beaker to test tubes, and the polymerization was continued in bulk for 24 hours. The resulting addition polymer was spread on Cellophane, Mylar, and Saran form a 10-percent solids solution in methanol, and the coated tapes along with control tapes coated with hydroxyethyl methacrylate per se were stored at 25° C. and 40 percent r.h. for 3 weeks.

Whereas the methacrylate per se even initially showed no clearly adhesive properties and dried completely within 2 days, the highly adhesive addition polymer was found at the end of the test period to have retained its marked pressure-sensitive adhesive property.

Whereas the adhesive peel strength at room temperature as measured by an Instron tester for stripping "Scotch" brand cellophane tape from specially prepared stainless steel surfaces at the rate of 12 in./min. averaged 1.5 lbs./sq. in. and registered a maximum value of 2.2 lbs./sq. in., tapes coated with a tert. butyl hydroperoxide catalyzed 1:1:1 reaction product of ETOG, hydroxyethyl methacrylate, and ethyl acrylate required an average peel force of 2.8 lbs./sq. in. and a maximum of 3.2 lbs./sq. in. to remove the tapes. When plies of manilla folder that had been laminated with the above adhesive were pulled apart at an angle of 180°, tearing of the paper fibers was evident, showing that the adhesive bond was stronger than the cohesive strength of the bonded material.

For price labels where a clean release is desirable a 2:1:1 ETOG, HEMA:Bu acrylate formulation has applicability.

The replacement of ethyl acrylate in the penultimate formulation with octyl acrylate facilitated the release of the adhesive from a paper substrate and also to a very small extent at 5° C. exceeded the negligible adhesion to steel at that temperature of "Scotch" brand tape.

We claim:
1. A pressure-sensitive adhesive tape comprising a backing layer to which has been applied a tert. butyl peroxide initiated addition polymer resulting from copolymerizing a mixture of 1 part hydroxyethyl methacrylate and 1 part of a purified gluten hydrolysate derivative that is formed by reacting 5 parts by weight of ethylene oxide with 1 part by weight of a partially hydrolyzed gluten polypeptide material having an average molecular weight of from about 10,000 to 20,000 and wherein the polypeptides contain amino groups corresponding to 1.4 $\mu$M leucine equivalents per milligram of total nitrogen.

2. A pressure-sensitive adhesive tape as described in claim 1 in which the tert. butyl peroxide initiated addition polymer results form the copolymerization of said mixture which contains an additional 1 part of a material selected form the group consisting of ethyl acrylate and octyl actylate.